(12) United States Patent
Higashimura et al.

(10) Patent No.: US 9,501,954 B2
(45) Date of Patent: Nov. 22, 2016

(54) DENTAL MODEL AND MODEL TEETH

(75) Inventors: Akihiro Higashimura, Kyoto (JP); Toshimitsu Kokubo, Kyoto (JP)

(73) Assignee: NISSIN DENTAL PRODUCTS INC., Kyoto (JP)

( * ) Notice: Subject to any disclaimer, the term of this patent is extended or adjusted under 35 U.S.C. 154(b) by 579 days.

(21) Appl. No.: 14/004,050

(22) PCT Filed: Mar. 13, 2012

(86) PCT No.: PCT/JP2012/056477
§ 371 (c)(1),
(2), (4) Date: Oct. 30, 2013

(87) PCT Pub. No.: WO2012/124714
PCT Pub. Date: Sep. 20, 2012

(65) Prior Publication Data
US 2014/0045160 A1    Feb. 13, 2014

(30) Foreign Application Priority Data

Mar. 14, 2011  (JP) ................................. 2011-055288

(51) Int. Cl.
*G09B 23/28* (2006.01)
(52) U.S. Cl.
CPC .................. *G09B 23/283* (2013.01)
(58) Field of Classification Search
USPC ............................ 434/262, 263; 433/74, 213
See application file for complete search history.

(56) References Cited

U.S. PATENT DOCUMENTS 3,886,661 A * 6/1975 Neill .................... G09B 23/283
434/263
4,242,812 A * 1/1981 Randoll ............... G09B 23/283
433/74

(Continued)

FOREIGN PATENT DOCUMENTS

EP    1 156 463 A1    11/2001
JP    58-123910 U     8/1983

(Continued)

*Primary Examiner* — Kurt Fernstrom
(74) *Attorney, Agent, or Firm* — Muncy, Geissler, Olds & Lowe, P.C.

(57) ABSTRACT

The purpose of the present invention is to provide a dental model capable of strongly fixing model teeth to a model main body and capable of configuring model teeth with a desired length. This dental model is provided with a model main body, model teeth which have a dental crown and a dental root and which are attached to the model main body, and screws which have a shaft and a head and which detachably connect the model teeth to the model main body. The model main body is provided with a base, dental root arrangement units which are provided on one surface of the base and in which the dental roots are arranged, holes which are formed in the dental root arrangement units and through which the shafts are inserted, and support pieces which protrude from the one surface of the base and which support the lateral surface of the dental roots arranged in the dental root arrangement units. The model teeth are provided with screw holes into which the shafts are screwed, and with supported parts which are supported by the support pieces.

10 Claims, 7 Drawing Sheets

(56) References Cited

U.S. PATENT DOCUMENTS

| | | | | |
|---|---|---|---|---|
| 4,902,232 | A * | 2/1990 | Neustadter | G09B 23/283 434/263 |
| 5,030,102 | A * | 7/1991 | Lang | G09B 23/283 433/193 |
| 5,320,529 | A * | 6/1994 | Pompa | A61C 1/084 433/214 |
| 6,257,895 | B1 * | 7/2001 | Oestreich | G09B 23/34 434/263 |
| 6,524,105 | B2 | 2/2003 | Raffeiner | |
| 7,713,063 | B2 * | 5/2010 | Lee | G09B 23/283 434/263 |
| 7,713,064 | B2 * | 5/2010 | Schulz | G09B 23/283 434/263 |
| 8,465,291 | B2 * | 6/2013 | Bell | G09B 23/283 434/262 |
| 8,696,361 | B2 * | 4/2014 | Woidschutzke | G09B 23/283 434/262 |
| 2001/0044092 | A1 | 11/2001 | Raffeiner | |
| 2008/0227072 | A1 | 9/2008 | Schulz | |

FOREIGN PATENT DOCUMENTS

| | | |
|---|---|---|
| JP | 61-31206 | 9/1986 |
| JP | 5-27675 A | 2/1993 |
| JP | 2002-000628 A | 1/2002 |
| JP | 2007-328083 A | 12/2007 |

* cited by examiner

DENTAL MODEL AND MODEL TEETH

TECHNICAL FIELD

The present invention relates to a dental model and a model tooth.

BACKGROUND ART

Conventionally, in dental educational institutions (dental universities, schools for dental hygienists, schools for dental technicians), dental clinics, dental seminars and the like, dental models are used for various types of training. Such dental models are provided with a model body and two or more model teeth detachably fixed to the model body.

In a conventional dental model, model teeth are screwed into a model body so that the model teeth are detachably attached to the model body (for example, see Patent Literature 1). In this context, the model teeth need to be fixed to the model body firmly enough to withstand training procedures. Accordingly, in the conventional dental models, a screw for fixing a model tooth needs to have a longer shaft.

Meanwhile, a dental model which is used for training, needs to have model teeth similar to the actual teeth in the size and shape. For example, in a model tooth, a neuropore portion may be provided at a region through which a nerve passes, as in the real tooth. In the case of the real tooth, a nerve is also present at a tooth root which corresponds to a root portion of the tooth.

[Patent Document 1] Japanese Unexamined Patent Application, Publication No. 2007-328083

DISCLOSURE OF THE INVENTION

Problems to be Solved by the Invention

However, in the conventional dental models, a screw hole portion which is formed at a tooth root in a model tooth and into which a screw is screwed will have a long length in a case where the screw has a long shaft in order to firmly fix the model tooth to the model body. Therefore, a neuropore portion can not be provided at a portion in the tooth root where the screw hole portion is formed.

Further, for example, in order to provide a neuropore portion at the tooth root of a model tooth and firmly fix the model tooth to the model body, a portion in which a screw hole portion is formed and a portion in which a neuropore portion is formed need to be provided at the tooth root. As a result, in such a case, the length of the model tooth will be longer than that of the real tooth, causing problems that the model tooth differs from the real tooth in the size and shape, and may not be accommodated in a certain space between the upper and lower jaws.

Therefore, an object of the present invention is to provide a dental model in which model teeth can be firmly fixed to the model body, and the model teeth can be arranged in a desired length. Another object of the present invention is to provide model teeth used for the dental model.

Means for Solving the Problems

The present invention relates to a dental model comprising a model body; a model tooth having a tooth crown and a tooth root and attached to the model body; and a screw having a shaft and a head and detachably connecting the model tooth to the model body, the shaft having a peripheral surface on which a male thread portion is formed, wherein the model body comprises a base member; a tooth, root placement portion provided in one surface of the base member, the tooth root being arranged at the tooth root placement portion; a hole portion provided at the tooth root placement portion in the base members the shaft being inserted through the hole portion; and a supporting piece projected from the one surface of the base member and supporting a side surface of the tooth root arranged at the tooth root placement portion, and wherein the model tooth comprises a screw hole portion into which the shaft is screwed; and a supported portion provided at the side surface of the tooth root and supported by the supporting piece.

Further, preferably, an engaging convex portion which projects toward the side surface of the tooth root is formed at an end of the supporting piece, and an engaging concave portion which engages with the engaging convex portion is formed at the supported portion.

Further, preferably, an engaging convex portion which projects toward the supporting piece is formed at the supported portion, and an engaging concave portion which engages with the engaging convex portion is formed at the end of the supporting piece.

Further, the tooth root preferably comprises an actual tooth portion located at the side of the tooth crown; and an extension portion having the screw hole portion and located at the base end side of the model tooth distant from the actual tooth portion, the model tooth preferably comprising a neuropore portion extending from the tooth crown through the actual tooth portion.

Preferably, the model body further comprises a gum portion arranged at one surface of the base member, the gum portion comprising a tooth root insertion portion which is formed at a position corresponding to the tooth root placement portion and through which the tooth root is inserted.

Further, the supporting piece is preferably arranged on the inside of the model tooth in the base member.

Preferably, the model body further comprises a contact piece arranged at a position facing the supporting piece across the model tooth in the base member and the contact piece coming into contact with the side face of the tooth root.

Further, preferably, the screw hole portion includes a portion having a smaller diameter than that of the shaft, and the screw is connected with the model tooth as scraping off the peripheral surface of the screw hole portion with the male thread portion.

The present invention relates to a model tooth detachably attached to a tooth root placement portion in a model body comprising a base member, the tooth root placement portion provided in one surface of the base member, a hole portion formed at the tooth root placement portion in the base member, a supporting piece projected from the one surface of the base member, the model tooth comprising a tooth crown, a tooth root having an end surface which comes into contact with the tooth root placement portion, a screw hole portion provided at the end surface of the tooth root, and a supported portion provided at a side surface of the tooth root and supported by the supporting piece.

Preferably, the model tooth further comprises an engaging concave portion formed in the supported piece and capable of engaging with an engaging convex portion formed in the supporting piece.

Preferably, the model tooth further comprises an engaging convex portion formed in the supported piece and capable of engaging with an engaging concave portion formed in the supporting piece.

Effects of the Invention

According to the dental model of the present invention, a model tooth can be firmly fixed in the model body, and the model tooth can be arranged in a desired length.

Figure 1:
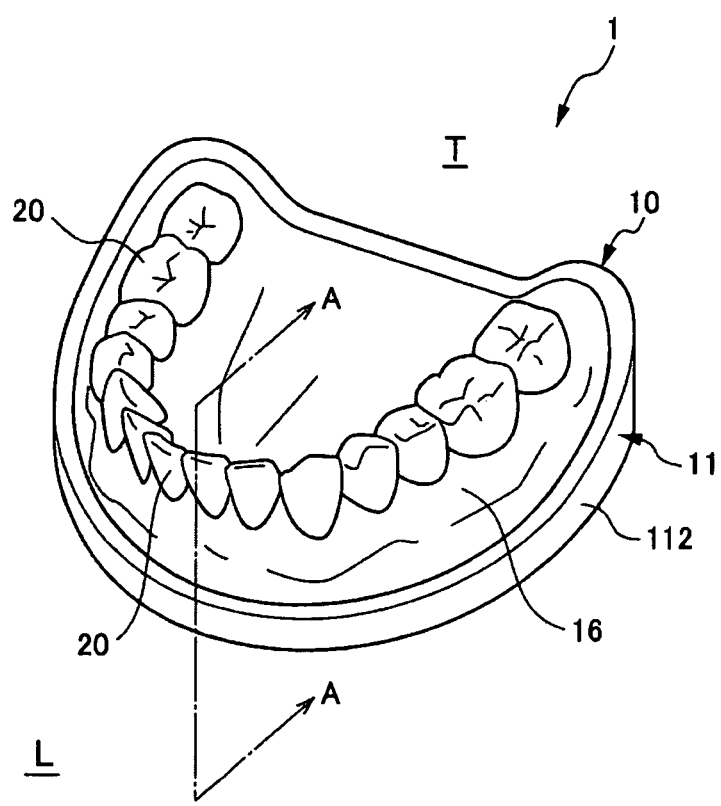
FIG. 1 is a perspective view of the dental model according to the first embodiment.

EXPLANATION OF REFERENCE NUMERALS 1 dental model
10 model body
11 base member
11a one surface
12 tooth root placement portion
13 hole portion
15 supporting piece
16 gum portion
17 contact piece
20 model tooth
21 tooth crown
22 tooth root
23 neuropore portion
24 screw hole portion
25 supported portion
30 screw
31 shaft
32 head
151 engaging convex portion
162 tooth root insertion portion
251 engaging concave portion
221 actual tooth portion
222 extension portion
T tongue side (inner side)
L labial side (buccal side)

PREFERRED MODE FOR CARRYING OUT THE INVENTION

In the followings, embodiments of a dental model 1 according to the present invention will be described with reference to the drawings. First, the dental model 1 of the first embodiment will be described with reference to FIGS. 1 to 5.

The dental model 1 of the first embodiment imitates a portion of the human lower jaw, and is intended for use in training at dental educational institutions (dental universities, schools for dental hygienists, schools for dental technicians) dental clinics, dental seminars and the like.

Figure 2:
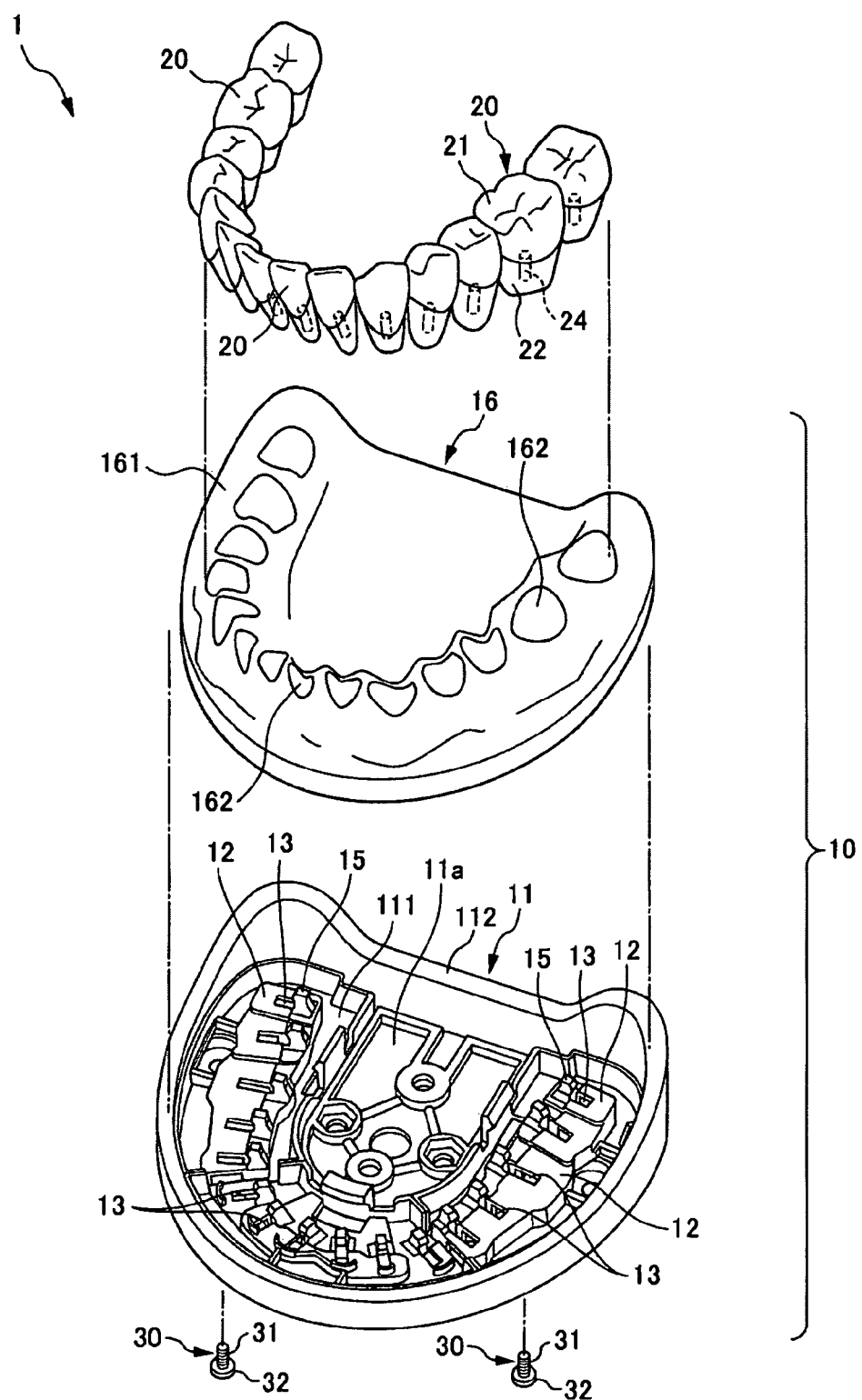
FIG. 2 is an exploded perspective view of the dental model according to the first embodiment.

The dental model 1 of the first embodiment comprises a model body 10, two or more model teeth 20 and two or more screws 30 detachably fixing these two or more model teeth 20 to the model body 10, as shown in FIGS. 1 and 2.

The model body 10 is composed of a jaw bone portion and a gum portion in the dental model 1. This model body 10 configures a base member 11 which largely corresponds to the jaw bone portion, and a gum portion 16 which largely configures to the gum portion.

The base member 11 can be molded using a hard synthetic resin material. This base member 11 comprises a base plate 111, two or more tooth root placement portions 12 provided in the base plate 111, two or more hole portions 13, two or more supporting pieces 15 and a peripheral wall 112 standing upward from an outer periphery edge of the base plate 111, as shown in FIGS. 2 to 4.

As shown in FIG. 2, the base plate 111 has an approximately semi-elliptical and plate-like shape as viewed in the plane view.

The two or more tooth root placement portions 12 are provided at the positions where the two or more model teeth 20 are to be arranged in the dental model 1. More specifically, the two or more tooth root placement portions 12 are provided inside and along the arched edge of the base plate 111 with a certain distance from the edge.

Figure 3:
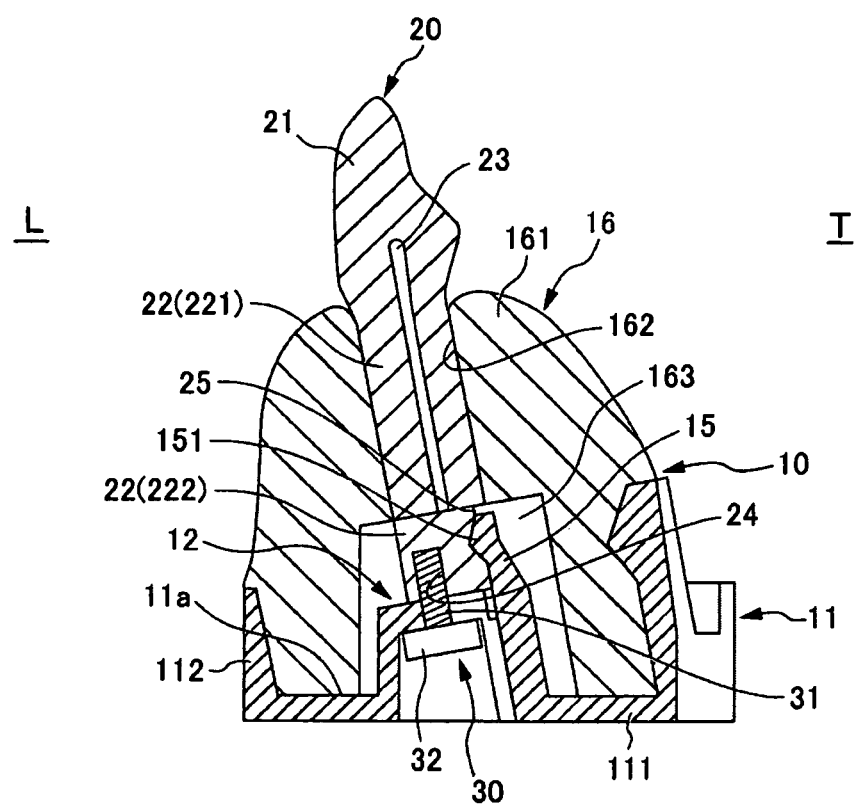
FIG. 3 is a cross sectional view along the A-A plane of FIG. 1 of the dental model according to the first embodiment.
Figure 4:
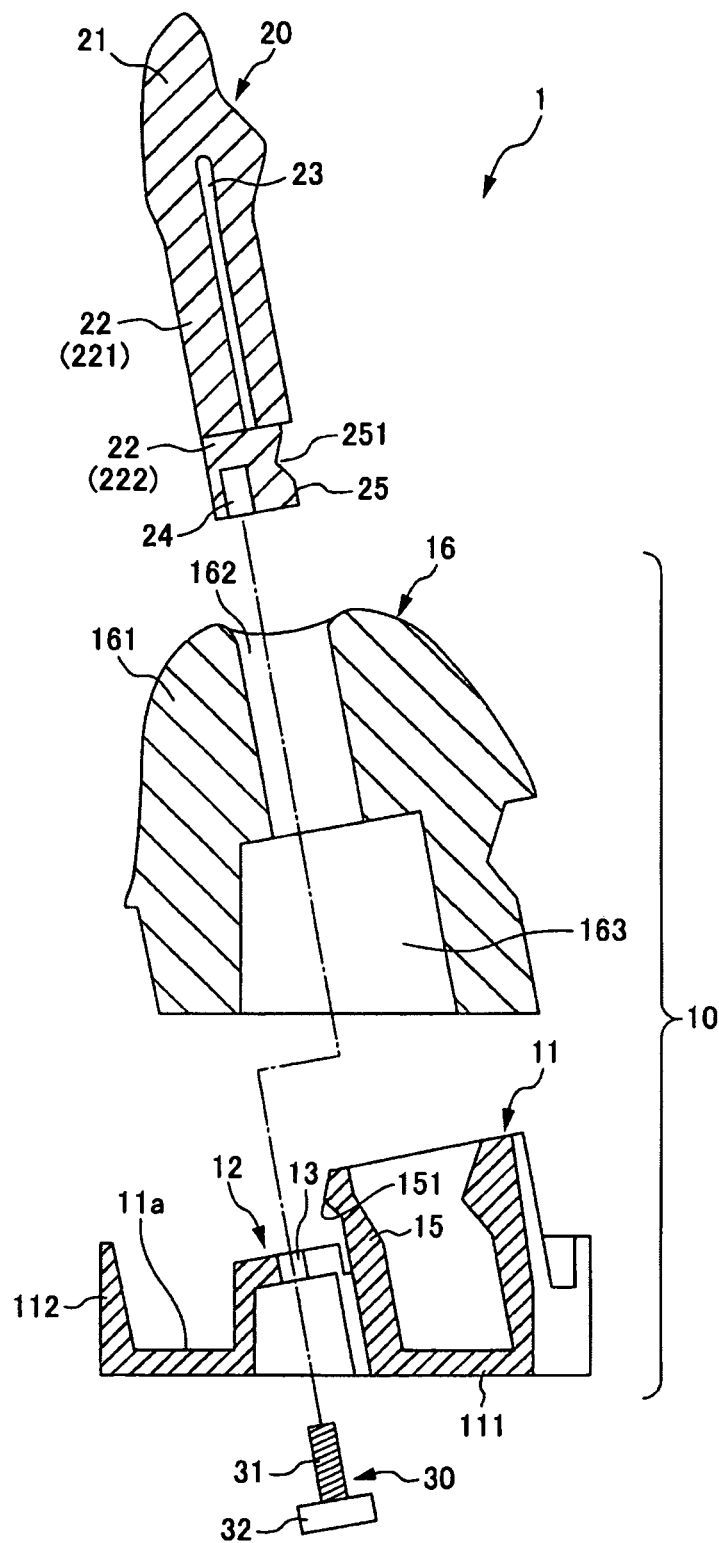
FIG. 4 is an exploded view of the dental model shown in FIG. 3.

As shown in FIGS. 3 and 4, the two or more tooth root placement portions 12 are composed of a portion of the base member 11 convexly projected from one surface 11a of the base member 11.

The two or more hole portions 13 are each provided at each of the two or more tooth root placement portions 12. The two or more hole portions 13 are formed at the projected end surface (the top surface in the first embodiment) of the two or more tooth root placement portions 12.

As shown in FIGS. 2 to 4, the two or more supporting pieces 15 are each provided at a corresponding tooth root placement portion, of the two or more tooth root placement portions 12 and project from the one surface 11a of the base member 11. As shown in FIG. 2, the two or more supporting pieces 15 are arranged inside the place in which the two or more tooth root placement portions 12 are provided in the base member 11. As shown in FIGS. 3 and 4, the two or more supporting pieces 15 project upto a position higher than the top surface of the two or more tooth root placement portions 12, and an engaging convex portion 151 projected toward the tooth root placement portion is formed at the end of these two or more supporting pieces 15.

As shown in FIG. 2, the peripheral wall 112 stands up on one surface 11a from the entire perimeter of the base plate 111.

According to the first embodiment, the base plate 111, the two or more tooth root placement portions 12, the two or more supporting pieces 15 and the peripheral wall 112 in the base member 11 can be integrally molded by injection molding and the like.

The gum portion 16 is arranged at the one surface 11a of the base member 11. As shown in FIGS. 2 to 4, this gum portion 16 comprises a tooth root cover member 161 which covers the two or more tooth root placement portions 12, and two or more tooth root insertion portions 162 and two or more gum recessed portions 163 provided at this tooth root cover member 161.

The tooth root cover member 161 is arranged so that it raises over the one surface lie side of the base member 11 to cover the tooth root placement portions 12 and the supporting pieces 15 from the inside of the peripheral wall 112. The two or more tooth root insertion portions 162 are provided at the positions corresponding to the two or more tooth root placement portions 12.

The two or more tooth root insertion portions 162 comprise a through hole portion formed in the tooth root cover member 161, the through hole portion having a shape corresponding to the shape of the model tooth 20 (more specifically, the tooth root 22 described below) arranged in the corresponding tooth root placement portion 12.

The two or more gum recessed portions 163 are provided at the side facing the base member 11 in the gum portion 16. The two or more gum recessed portions 163 are each formed such that the tooth root placement portion 12 and the supporting piece 15 are covered. The two or more gum recessed portions 163 are more extensively depressed than the projection of the tooth root placement portion 12 and the supporting piece 15. By this, when the gum portion 16 is arranged at the one surface 11a of the base member 11, space is formed between the gum portion 16 and the tooth root placement portion 12 and between the gum portion 16 and the supporting piece 15, as shown in 3. The two or more gum recessed portions 163 are each formed successively at the corresponding tooth root insertion portions 162.

The gum portion 16 described above can be formed by injection molding of an elastic soft synthetic resin material.

The two or more model teeth 20 are attached to the model body 10. As shown in FIGS. 2 to 4, the two or more model teeth 20 each comprise a tooth crown 21, the tooth root 22, a neuropore portion 23, a screw hole portion 24 and a supported portion 25.

The tooth crown 21 is a portion exposed from the gum portion 16 when the model tooth 20 is fixed to the model body 10.

Figure 5:
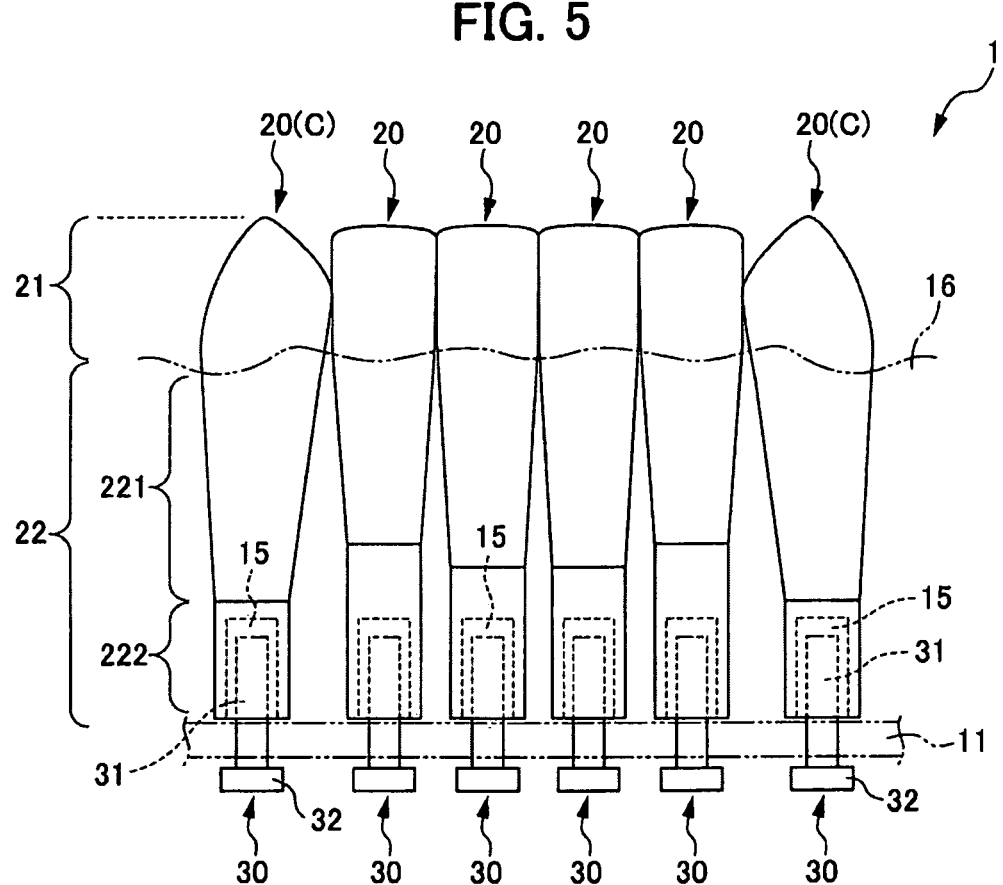
FIG. 5 is a schematic front view of the dental model according to the first embodiment.

The tooth root 22 is a portion covered with the gum portion 16 when the model tooth 20 is fixed to the model body 10. As shown in FIGS. 3 to 5, this tooth root 22 comprises an actual tooth portion 221 located at the side of the tooth crown 21, and an extension portion 222 located at the side of the base end of the actual tooth portion 221 in the model tooth 20.

The actual tooth portion 221 can be configured to have a thickness and a length corresponding to an anatomically desired length of a tooth.

The extension portion 222 is arranged at the end of the actual tooth portion 221 opposite to the tooth crown 21. The length of the extension portion 222 is preferably 19 mm or less, more preferably 4 mm or less in order to provide the dental model 1 having a realistic shape similar to that of the human jaw. Further, the length of the extension portion 222 is preferably 1 mm or more, more preferably 3 mm or more in order to fix the model tooth 20 with appropriate strength, given the support of the model tooth 20 by the supporting piece 15 and the supported portion 26 as described below.

The neuropore portion 23 is formed at the approximately central portion of the model tooth 20 as viewed in the cross sectional view, and extends from the tooth crown 21 through the actual tooth portion 221.

The screw hole portion 24 is formed in the extension portion 222. A thread groove is formed on the peripheral surface of the screw hole portion 24. According to the first embodiment, the screw hole portion 24 has a length of 4 mm.

The supported portion 25 is provided at the side surface of the tooth root 22 (at the side surface of the extension portion 222 in the first embodiment). More specifically, the supported portion 25 is provided at the place facing toward an inner side T of the dental model 1 (the side at which the tongue is located) when the model tooth 20 is fixed to the model body 10, as shown in FIGS. 3 and 4. This supported portion 25 comes into contact with and is supported by the supporting piece 15 when the model tooth 20 is fixed to the model body 10. An engaging concave portion 251 having a shape corresponding to the engaging convex portion 151 in the supporting piece 15 is formed in the supported portion 25.

The model tooth 20 described above can be formed by injection molding of hard synthetic resin material. Further, the screw hole portion 24 is not composed of a metal component, but is directly formed in the synthetic resin material of the model tooth.

The screw 30 comprises a shaft 31 and a head 32. The shaft 31 has a length corresponding to the length of the screw hole portion 24. A screw thread corresponding to the thread groove of the screw hole portion 24 is formed on the peripheral surface of the shaft 31.

The head 32 has a larger diameter than the width of the hole portion 13 provided in the base member 11.

The screw 30 described above is inserted through the hole portion 13 from the surface opposite to the one surface of the base member 11.

Next, procedures for assembling the dental model 1 of the first embodiment will be described.

First, the gum portion 16 is attached to the one surface 11a of the base member 11 to assemble the model body 10. In this case, in the gum portion 16, the gum recessed portion 163 more extensively depressed than the projection of the tooth root placement portion 12 and the supporting piece 15 is provided at the place corresponding to the tooth root placement portion 12 and the supporting piece 15 (see FIG. 3). By this, predefined space is formed between the tooth root placement portion 12 and the gum portion 16 and between the supporting piece 15 and the gum portion 16 in the model body 10. Further, each position of the two or more hole portions 13 corresponds to the respective position of the two or more tooth root insertion portions 162.

Subsequently, the two or more model teeth 20 are attached to the model body 10. In this case, the tooth root 22 is first inserted through the tooth root insertion portion 162 from the side of the gum portion 16. Then, the supported portion 25 provided at the side surface of the extension portion 222 comes into contact with the supporting piece 15 in the base member 11. When the tooth root 22 is inserted with this state maintained, the supporting piece 15 is pressed by the tooth root 22 to undergo an elastic deformation toward the tongue side T.

When the model tooth 20 is further inserted from this state, the end of the extension portion 222 comes into contact with the projected end surface (the top surface) of the tooth root placement portion 12 in which the hole portion 13 is formed. Further, the engaging convex portion 151 formed at the supporting piece 15 engages with the engaging concave portion 251 formed at the supported portion 25 in the extension portion 222. By this, the model tooth 20 is supported to the model body 10 through the supporting supported portion 25 in the tooth root 22 by the supporting piece 15.

Next, the screw 30 is inserted through the hole portion 13 from the side opposite to the one surface of the base member 11, and screwed into the screw hole portion 24 formed in the extension portion 222. By this, the model tooth 20 is firmly fixed to the base member 11 (the tooth root placement portion 12) by both the supporting piece 15 and the screw 30.

In order to replace the model tooth 20, the screw 30 is loosened and removed, and then the model tooth 20 is pulled out upward. In this case, the supporting piece 15 also undergoes elastic deformation to allow the engaging convex portion 151 to be disengaged from the engaging concave portion 251. Therefore, the model tooth 20 can be easily removed.

According to the first embodiment, the two or more model teeth 20 are arranged in the approximately same length, as shown in FIG. 5. More specifically, the length of the two or more model teeth 20 is equal to the sum of the length of the tooth crown 21 and the actual tooth portion 221 of a canine tooth C having the largest anatomically required length and the length of the extension portion 222 provided without compromising the shape of the human jaw (about 4 mm in the case of the canine tooth C). That is, the two or more model teeth 20 each may differ in the anatomically required length, but the model teeth 20 as a whole can have the approximately same length by suitably adjusting the length of the extension portion 222.

According to the dental model 1 of the first embodiment described above, the following advantageous effects can be achieved.

(1) In the dental model 1 having the model body 10 (the base member 11) comprising the supporting piece 15, the model tooth 20 comprising the supported portion 25 and the screw 30, the model tooth 20 was fixed to the base member 11 with the supporting piece 15 and the screw 30. By this, the model tooth 20 can be fixed to the base member 11 by two means: the supporting piece 15 and the screw 30. Therefore, even in a case where the shaft of the screw 30 is short (for example, about 4 mm), the model tooth 20 can be firmly fixed to the model body 10. Therefore, the model tooth 20 can be arranged in a desired length since the screw hole portion 24 in the model tooth 20 into which the screw 30 is screwed may have a shorter length.

Further, the model tooth 20 may be fixed by the screw 30 with smaller anchorage strength such that the screw hole portion 24 may be formed directly in the tooth root 22 made of a synthetic resin material without using a metal female screw (a nut). Therefore, the model tooth 20 can be manufactured without separately preparing and attaching a metal female screw, and thus the manufacturing cost of the model tooth 20 can be reduced.

(2) An engaging convex portion 15a was formed at the end of the supporting piece 15, and an engaging concave portion 22a with which the engaging convex portion 15a engages was formed at the side surface of the tooth root 22 (the extension portion 222). By this, the model, tooth 20 can be more firmly fixed to the model body 10 (the base member 11) since the supported portion 25 can be more firmly supported by the supporting piece 15.

(3) The tooth toot 22 was prepared comprising the actual tooth portion 221 and the extension portion 222, and the screw hole portion 24 was formed in this extension portion 222. Further, the model tooth 20 was prepared comprising the neuropore portion 23 which extends from the tooth crown 21 through the actual tooth portion 221. By this, the model tooth 20 comprising the neuropore portion 23 can be prepared having a similar structure to the real tooth since the screw hole portion 24 is not formed in the actual tooth portion 221. Further, since the screw hole portion 24 can be shortened, the length of the extension portion 222 can also be shortened. Therefore, the presence of the extension portion 222 can prevent the shape of the model tooth 20 being greatly different from that of the real tooth. As a result, the shape of the dental model 1 comprising the model teeth 20 can show a similar shape to the actual jaw.

(4) The gum portion 16 was arranged at the top surface of the base member 11, and the tooth root insertion portion 162 through which the model tooth 20 would be inserted was formed in this gum portion 16. By this, the supported portion 25 can be more suitably supported by the supporting piece 15 since the periphery of the model tooth 20 inserted into the tooth root insertion portion 162 can be supported by the gum portion 16.

(5) The gum recessed portion 163 was provided at the gum portion 16 such that space was created between the gum portion 16 and the tooth root placement portion 12 and between the gum portion 16 and the supporting piece 15. By this, the supporting piece 15 may easily undergo elastic deformation toward the tongue side T since space is formed in a tongue side T of the supporting piece 15. Therefore, the model tooth 20 can be more easily attached to the model body 10.

(6) The gum portion 16 at the labial side (buccal side) L in the outside of the model tooth 20 is thinner as compared with at the tongue side T in the inside of the model tooth 20. Further, the tooth root of a back tooth (not shown) is branched into two at the buccal side L, but not branched and remains one at the tongue side T. Accordingly, the supporting piece 15 was arranged on the inside of the model tooth 20 (the tongue side T) in the base member 11. By this, even in a case where the gum portion 16 is formed as in the real gum, the supporting piece 15 will not be exposed from the gum portion 16, and the supporting piece 15 can be more suitably covered with the gum portion 16. Therefore, a more realistic dental model 1 can be provided. Further, even in a back tooth where the tooth root at the buccal side L is branched into two, the model tooth 20 can be suitably supported at the tongue side T in which the tooth root remains one.

(7) For each of the two or more model teeth 20, the length of the extension portion 222 was varied depending on the anatomically required length of the tooth to arrange the two or more model teeth 20 in the approximately same full length. By this, the structure of the model body 10 can be simplified since the shape of the base member 11 to which the model teeth 20 are fixed can be simplified.

Figure 6:
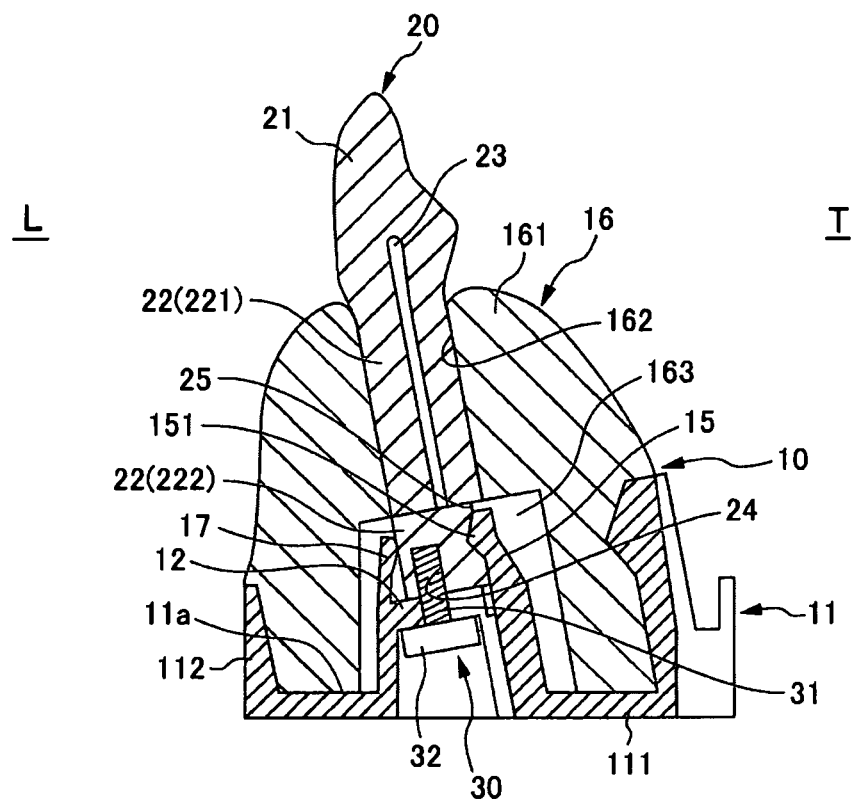
FIG. 6 is a cross sectional view along the A-A plane of FIG. 1 of the dental model according to the second embodiment.
Figure 7:
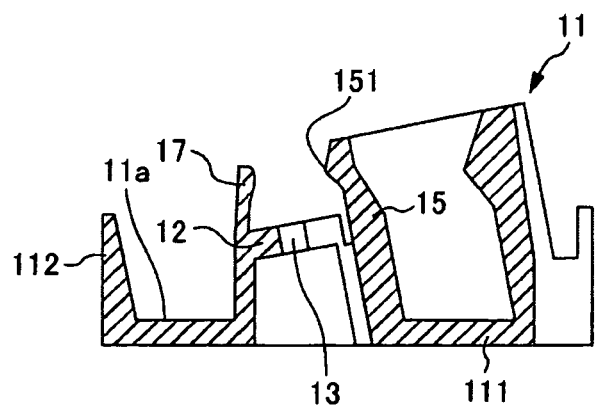
FIG. 7 is a cross sectional view of the dental model shown in FIG. 6.

Next, the second embodiment of the dental model according to the present invention is described referring to FIGS. 6 and 7.

Note that for the purpose of describing the second embodiment, the identical reference number is assigned to the identical component, and its description is omitted or simplified.

The dental model 1 of the second embodiment differs from the first embodiment in the configuration of the model body 10. Specifically, in the second embodiment, the model body 10 further comprises a contact piece 17.

As shown in FIGS. 6 and 7, the contact piece 17 is arranged at a position facing the supporting piece 15 across the model tooth 20 in the base member 11. In the first embodiment, the contact piece 17 is arranged in the outer side L of the position in which the two or more tooth root placement portions 12 are provided in the base member 11. This contact piece 17 comes into contact with the sides surface of the tooth root 22 (the extension portion 222) when the model tooth 20 is attached to the tooth root placement portion 12. The contact piece 17 has been integrally molded with the base member 11.

According to a dental model 1A of the second embodiment, the following advantageous effects can be achieved in addition to (1) to (7) described above.

(8) The contact piece 17 was provided in the base member 11, and this contact piece 17 was allowed to come into contact with the side surface (the labial side L) of the tooth root 22 (the extension portion 222). By this, the model tooth 20 can be more strongly fixed to the base member 11 since the model tooth 20 is supported by both the supporting piece 15 and the contact piece 17.

Further, by providing the contact piece 17, the model tooth 20 can be temporary attached (positioned) at an exact position against the supporting piece 15. Therefore, the shaft 31 of the screw 30 can be easily screwed into the screw hole portion 24 in the model tooth 20. Accordingly, the model tooth 20 can be easily attached to the base member 11.

Figure 8A:
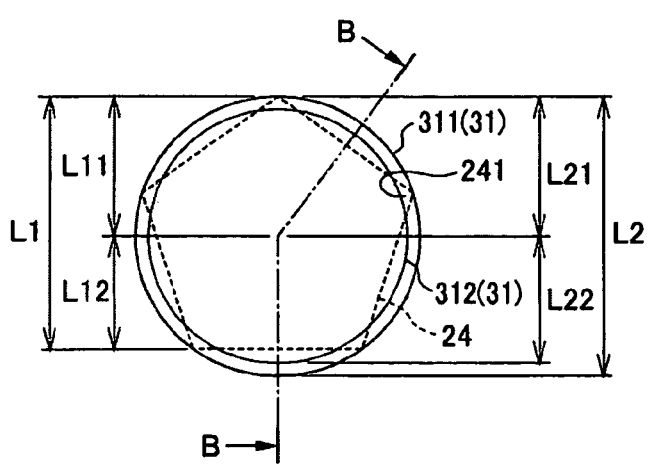
FIG. 8A schematically shows the relationship between the shape and size of the screw hole portion and the diameter of the screw shaft in the dental model of the third embodiment.
Figure 8B:
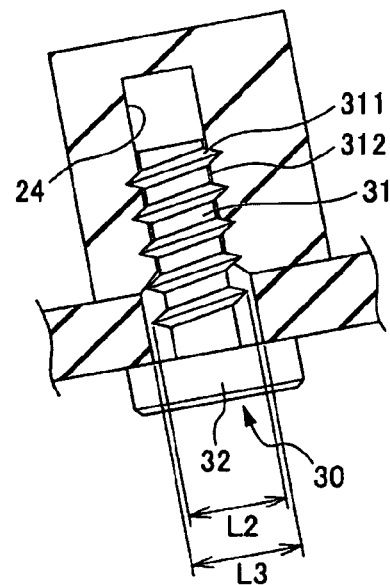
FIG. 8B is a cross sectional view along the B-B plane of FIG. 8A.

Next, the third embodiment of the dental model according to the present invention is described referring to FIG. 8. FIG. 8(A) schematically shows the relationship between the shape and size of the screw hole portion 24 and the diameter of the shaft 31 of the screw 30 in the dental model 1 of the third embodiment. FIG. 8(B) shows a cross sectional view along the B-B plane of FIG. 8(A).

The dental model 1 of the third embodiment differs from the first embodiment mainly in the configuration of the screw hole portion 24 in the model tooth 20.

In the third embodiment, as shown in FIG. 8(A), the screw hole portion 24 has an equilateral-pentagonal shape as viewed in a planar view (in a cross sectional view along the direction perpendicular to the direction in which a hole extends). Then, a diameter L1 of this screw hole portion 24 is smaller than a diameter L2 of the shaft 31 of the screw 30. In this case, the diameter of the shaft 31 represents a radial distance between the edges of a male thread portion 311 (the length at a position having the largest diameter in the shaft 31).

In more detail, a length L11 from the center to each vertex in the equilateral-pentagonal screw hole portion 24 is longer than a radius L22 at a thread groove 312 of the shaft 31, and in this embodiment, is equal to the radius L21 at the male thread portion 311 of the shaft 31. Further, the length L12 from the center to the midpoint of each side in the screw hole portion 24 is shorter than the radius L22 at the thread groove 312 of the shaft 31.

As shown in FIG. 8(B), a diameter L3 at the entrance of the screw hole portion 24 is larger than the diameter of the shaft 31. Then, the diameter of the screw hole portion 24 is increasingly reduced from the diameter L3 at the entrance to give the diameter L2 at the back side, and then further extends in a size of the diameter L2. Further, in the third embodiment, a thread groove is not formed in the screw hole portion 24.

In the dental model 1 of the third embodiment, the model teeth 20 are fixed to the model body 10 as follows.

First, in the model tooth 20 arranged at the tooth root placement portion 12, the screw 30 is inserted through the hole portion 13 from the surface opposite to the one surface of the base member 11, and the end of the shaft 31 is positioned at the entrance of the screw hole portion 24. Then, the screw is inverted until the end of the shaft 31 comes into contact with a portion having a reduced diameter in the screw hole portion 24. Subsequently, the screw 30 is pressed into the screw hole portion 24 while rotating the shaft 31. Then, the shaft 31 is screwed into the screw hole portion 24 whilst scraping off the peripheral surface of the screw hole portion 24 with the male thread portion 311. By this, the model tooth 20 is fixed to the model body 10.

In this case, as shown in FIG. 8(A), a synthetic resin material of the model tooth 20 which has been scraped off by the male thread portion 311 will be accumulated in a gap 241 formed between the screw hole portion 24 and the shaft 31.

According to the dental model 1 of the third embodiment, the following advantageous effects can be achieved in addition to (1) to (7) described above.

(9) The screw hole portion 24 was prepared having a portion with a smaller diameter than that of the shaft 31. By this, the screw 30 can be connected to the model tooth 20 whilst scraping off the peripheral surface of the screw hole portion 24 with the male thread portion 311. Therefore, the model tooth 20 can be more easily molded since the model tooth 20 can be molded without forming a thread groove in the screw hole portion 24.

(10) The screw hole portion 24 was prepared having a portion longer that the radius L22 at the thread groove 312. By this, a synthetic resin material of the model tooth 20 which is scraped off by the male thread portion 311 when the shaft 31 is screwed into the screw hole portion 24 will be accumulated in the gap 241 formed between the screw hole portion 24 and the shaft 31. Therefore, the shaft 31 can be appropriately screwed into the screw hole portion 24 since the synthetic resin material scraped off by the male thread portion 311 does not interfere with the insertion of the shaft 31 into the screw hole portion 24.

Although preferred embodiments of the present invention are described above, the present invention should not be limited to the above embodiments, and the present invention can be performed in various forms.

For example, the present invention is applied to the dental model 1 which imitates the structure of the lower jaw side in the first and second embodiments, but the present invention is not limited to this. That is, the present invention may be applied to a dental model which imitates the structure of the upper jaw side or a dental model which imitates the structure of both the upper jaw side and the lower jaw side.

Further, in the first and second embodiments, the base member 11 the base plate 111 and a peripheral wall 11b), the supporting piece 15 and the contact piece 17 are integrally provided, but the present invention is not limited to this. That is, the base member, the supporting piece and the contact piece may be each molded as a separate component, and combined together using an adhesive agent and the like.

Further, in the first and second embodiments, the supported portion 25 is formed in the extension portion 222, but the present invention is not limited to this. That is, the supported portion may be formed in the actual tooth portion.

Further, in the first and second embodiments, the supporting piece 15 is provided on the inside of the model tooth, but the present invention is not limited to this. The supporting piece 15 may be provided on the outside. The number of the supporting piece 15 is not limited to one per model tooth, but may be two or more. Further, the position and number of the supporting piece 15 may differ for each model tooth.

Further, in the first and second embodiments, the screw hole portion 24 is directly formed in the synthetic resin material of the model tooth, but the present invention is not limited to this. The screw hole portion 24 may be separately formed and then incorporated.

Further, in the first and second embodiment, engaging convex portion 15a is formed at the end of the supporting piece 15, and the engaging concave portion 22a with which the engaging convex portion 15a engages is formed at the side surface of the tooth root 22 (the extension portion 222), but the present invention is not limited to this. That is, the engaging convex portion may be formed in the side surface of the tooth root, and the engaging concave portion with which the engaging convex portion engages may be formed at the end of the supporting piece. Further, the engaging convex portion and the engaging concave portion may be provided as a set at both the side surface of the tooth root and the end of the supporting piece.

Figure 9A:
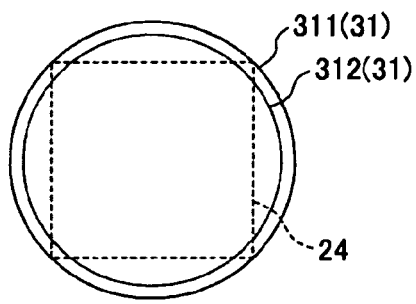
FIGS. 9A and 9B show exemplary shapes of modified screw hole portions.
Figure 9B:
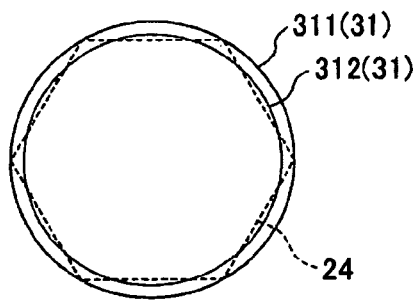

Further, in the third embodiment, the screw hole portion 24 has an equilateral-pentagonal shape, but the present invention is not limited to this. That is, the shape of the screw hole portion 24 may be any shapes, but preferably not a precise circle. In particular, a symmetrical shape, (for example, a regular polygonal shape) is preferred. For example, the shape of the screw hole portion 24 may be a square as shown in FIG. 9(A), or a regular-hexagonal shape as shown in FIG. 9(B). Note that the shape of the screw hole portion 24 may be a precise circle.

In this context, in a case where the screw hole portion 24 has a polygonal shape, the male thread portion 311 engages with the peripheral surface of the screw hole portion 24 over broader area as the number of corners decreases. This increases the fixing force of the screw 30 to the model tooth 20, but requires more force for attachment and detachment (in particular, for attachment) of the screw 30 to the model tooth 20. On the other hand, the male thread portion 311 engages with the peripheral surface of the screw hole portion 24 over smaller area as the number of corners increases. This decreases the fixing force of the screw 30 to the model tooth 20, but allows easy attachment and detachment (in particular, attachment) of the screw 30 to the model tooth 20.

The invention claimed is:

1. A dental model comprising a model body; a model tooth having a tooth crown and a tooth root and attached to the model body; and a screw having a shaft and a head and detachably connecting the model tooth to the model body, the shaft having a peripheral surface on which a male thread portion is formed,
   wherein the tooth root comprises an actual tooth portion located at the side of the tooth crown, and an extension portion located at the side of a base end of the model tooth,
   wherein the model body comprises:
   a base member,
   a tooth root placement portion provided in one surface of the base member, the tooth root being arranged at the tooth root placement portion,
   a gum portion arranged on the one surface of the base member,
   a hole portion provided at the tooth root placement portion in the base member, the shaft being inserted through the hole portion, and
   a supporting piece projected from the one surface of the base member and arranged on an inside of the gum portion,
   wherein the model tooth comprises a screw hole portion, into which the shaft is screwed, and which is formed at the extension portion; and a supported portion provided at the side surface of the tooth root,
   wherein an engaging concave portion having a shape corresponding to the supporting piece is formed at the supported portion, and
   wherein the model tooth comprises a neuropore portion extending from the tooth crown through the actual tooth portion.

2. The dental model according to claim 1, wherein an engaging convex portion projected toward the side surface of the tooth root is formed at an end of the supporting piece, and
   the engaging concave portion with which the engaging convex portion engages is formed at the supported portion.

3. The dental model according to claim 1, wherein an engaging convex portion projected toward the supporting piece is formed at the supported portion, and
   the engaging concave portion which engages with the engaging convex portion is formed at the end of the supporting piece.

4. The dental model according to claim 1,
   the gum portion comprising a tooth root insertion portion formed at a position corresponding to the tooth root placement portion, the tooth root being inserted through the tooth root placement portion.

5. The dental model according to claim 1, wherein the supporting piece is arranged on the inside of the model tooth in the base member.

6. The dental model according to claim 1, wherein the model body further comprises a contact piece arranged at a position facing the supporting piece across the model tooth in the base member, the contact piece coming into contact with the side surface of the tooth root.

7. The dental model according to claim 1, wherein the screw hole portion has a portion having a smaller diameter than that of the shaft, and
   the screw is connected to the model tooth as scraping off the peripheral surface of the screw hole portion with the male thread portion.

8. A model tooth detachably attached to a tooth root placement portion in a model body, the model body comprising a base member, the tooth root placement portion provided in one surface of the base member, a gum portion arranged on the one surface of the base member, a hole portion formed at the tooth root placement portion in the base member, a supporting piece projected from the one surface of the base member and arranged on an inside of the gum portion,
   the model tooth comprising:
   a tooth crown,
   a tooth root comprising an actual tooth portion located at the side of the tooth crown, and an extension portion located at the side of a base end of the model tooth, wherein an end surface of the extension portion comes into contact with the tooth root placement portion,
   a screw hole portion provided at the end surface of the extension portion of the tooth root,
   a supported portion provided at a side surface of the tooth root, wherein an engaging concave portion having a shape corresponding to the supporting piece is formed at the supported portion, and
   a neuropore portion extending from the tooth crown through the actual tooth portion.

9. The model tooth according to claim 8, wherein the engaging concave portion is formed in the supported piece, the engaging concave portion being capable of engaging with an engaging convex portion formed in the supporting portion.

10. The model tooth according to claim 8, further comprising an engaging convex portion formed in the supported piece, the engaging convex portion being capable of engaging with the engaging concave portion formed in the supporting portion.

* * * * *